United States Patent [19]

Lukaszewicz et al.

[11] 4,257,845
[45] Mar. 24, 1981

[54] MIXING AND DISTRIBUTING DEVICE FOR GASES HAVING HIGH TEMPERATURE

[75] Inventors: Johannes Lukaszewicz; Ulrich Müller-Frank, both of Bergisch Gladbach; Herbert Reutler, Hohkeppel, all of Fed. Rep. of Germany

[73] Assignee: GHT, Gesellschaft fur Hochtemperaturreaktor-Technik mbH, Bergisch Gladbach, Fed. Rep. of Germany

[21] Appl. No.: 882,755

[22] Filed: Mar. 2, 1978

[30] Foreign Application Priority Data

Mar. 3, 1977 [DE] Fed. Rep. of Germany ....... 2709171

[51] Int. Cl.² .............................................. G21C 19/28
[52] U.S. Cl. ................................. 176/58 PB; 366/340
[58] Field of Search ....................... 176/58 PB, 60, 84; 366/340, 341; 48/180 R, 180 M

[56] References Cited

U.S. PATENT DOCUMENTS

| | | | |
|---|---|---|---|
| 3,100,187 | 8/1963 | Fraas | 176/58 PB |
| 3,128,794 | 4/1964 | Boucher et al. | 366/340 |
| 3,228,852 | 1/1966 | Holmes et al. | 176/58 PB |
| 3,560,338 | 2/1971 | Brown | 176/60 |
| 3,960,656 | 6/1976 | Lohnert et al. | 176/58 PB |
| 4,027,857 | 6/1977 | Cunningham | 366/340 |
| 4,121,973 | 10/1978 | Mysels et al. | 176/84 |

FOREIGN PATENT DOCUMENTS

| | | | |
|---|---|---|---|
| 1240897 | 5/1967 | Fed. Rep. of Germany . | |
| 2408926 | 9/1975 | Fed. Rep. of Germany | 176/58 PB |
| 2545013 | 4/1977 | Fed. Rep. of Germany | 176/58 PB |
| 2636251 | 2/1978 | Fed. Rep. of Germany | 176/58 PB |
| 964628 | 7/1964 | United Kingdom | 176/84 |
| 1090587 | 11/1967 | United Kingdom | 176/84 |

*Primary Examiner*—S. A. Cangialosi
*Attorney, Agent, or Firm*—Herbert L. Lerner

[57] ABSTRACT

Mixing and distributing device for gases having high temperature includes a multiplicity of polygonal blocks stacked in a plurality of layers above and laterally adjacent one another, the blocks being formed with channels having respective axes disposed at an angle to one another and to a main gas in-flow direction, the channels of the respective blocks being connected with adjacent channels of the same or an adjacent block, the multiplicity of polygonal blocks defining a space wherein high temperature is producible.

8 Claims, 10 Drawing Figures

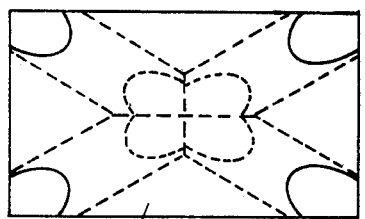
5f 5f Fig. 3
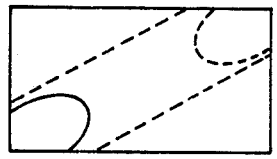
Fig. 7
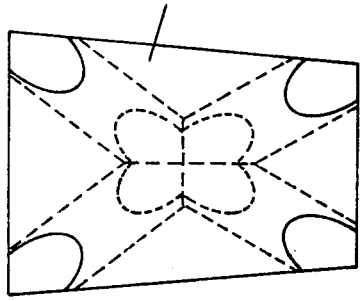
Fig. 4
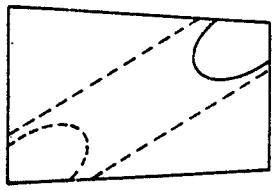
Fig. 8
10b Fig. 5
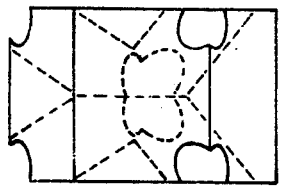
Fig. 9
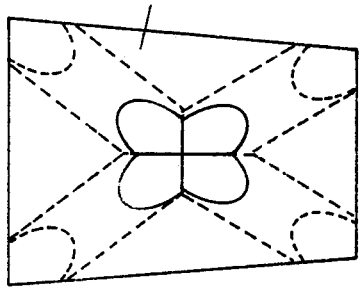
10b Fig. 6
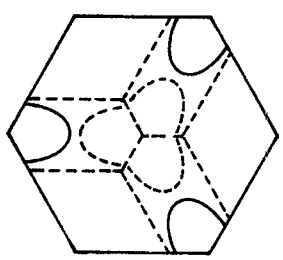
Fig. 10

MIXING AND DISTRIBUTING DEVICE FOR GASES HAVING HIGH TEMPERATURE

The invention of the instant application relates to a mixing and distributing device for hot gases and, more particularly, for a gas-cooled pebble-bed nuclear reactor, the heat of which is to be utilized, for example, for chemical process. Some chemical processes take place with sufficient yield only at very high temperatures in the range of about 1000° C. Since the strength of the usable materials decreases considerably above this temperature and since temperature differences, especially distinct strands of filaments of gas with higher or lower temperature, are unavoidable, the disadvantages of such gas strands are to be minimized by mixing them with the rest of the gas flow. In gas-cooled pebble-bed reactors these problems are of special importance. On the one hand, the surface of a pebble bed is naturally uneven and, on the other hand, the underside of such a pebble bed is bordered by one or more funnels which are to conduct the burned-up fuel pellets to one or more pellet discharge outlets. The differences stemming therefrom with respect to the length of the flow paths in the pebble bed result in different heating-up periods of the cooling gas and thus, to temperature strands. Other causes for varying gas outlet temperatures are the radial power density profile as well as absorber rod effects and margin or edge effects at the vessel wall. In view of the limited depth of penetration of the absorber rods and an economically justifiable power rating of the blowers, only the diameter of the pebble bed is increased in planned pebble bed reactors of high power rating as compared to reactors of lower power rating, with the height of the pebble bed remaining the same, which favors the development of temperature strands. More recent tests have shown that these temperature strands continue up to the heat exchanger and can cause trouble there or can shorten the life thereof. Gas-cooled pebble bed reactors, in which this invention can be used, are described, for example, in German Published Non-Prosecuted Application DT-OS No. 24 08 926.7 and 24 56 405.

It is accordingly an object of the invention to provide a mixing and distributing device with a large diameter/height ratio for equalizing temperature strands. For gas-cooled pebble bed reactors, this mixing device should, furthermore, divert the gases, which flow-in vertically from above, into a horizontal flow direction and distribute them over several gas channels distributed over the periphery of the reactors. If these pebble bed reactors are to be shut down in the nuclear-physics sence by the addition of a multiplicity of small balls or pellets of an absorbing material, it is a further object of the invention to provide such a mixing and distributing device which will have means for conducting these absorber pellets or balls to one or more discharge outlets distributed over the cross section of the reactor.

In the journals "Verfahrenstechnik" (1970), No. 12, pages 538 to 453, and "Chemie-Ingenieurtechnik" (1972), No. 18, pages 1051 to 1056, reports on turbulent mixing in pipes are provided. In these two papers as well as in the literature references mentioned therein, numerous different metallic inserts into pipelines are described, which homogenize varying gas strands by diversion or deflection, rotation and subsequent rectification, by throttling and by other measures. However, these devices are neither suitable for gas temperatures of about 1000° C. nor for the dimensions intended to be provided. The invention of the instant application is based on the idea that, at these high gas temperatures, the mixing device per se and the surroundings thereof must also be protected extensively against harmful temperature differences. In addition, by disposing this mixing device immediately after the pebble bed, avoidance of stressing due to temperature differences of a pipe line leading to a separate mixing device is effected.

With the foregoing and other objects in view, there is provided in accordance with the invention, a mixing and distributing device for gases having high temperature comprising a multiplicity of polygonal blocks stacked in a plurality of layers above and laterally adjacent one another, the blocks being formed with channels having respective axes disposed at an angle to one another and to a main gas in-flow direction, the channels of the respective blocks being connected with adjacent channels of the same or an adjacent block, the multiplicity of polygonal blocks defining a space wherein high temperature is producible.

The mixing and distributing device of the foregoing construction distributes the hot gas over a large number of channels which are brought together with other channels in each layer of the blocks and are subsequently split up again. Due to this repeated diverting or deflecting, bringing together and splitting-up anew, temperature differences over the cross section are equalized very rapidly. Due to the split-up over numerous blocks in several layers, proposed in accordance with the invention, each individual block is subjected only to slight temperature differences and thereby, also, to only slight temperature stresses. Since each block is traversed by several channels, no significant temperature differences are expected, also between the outside and the inside thereof. By defining or limiting the space wherein the high temperature is generated, in accordance with the invention, not only is spaced saved, but also, the provision of any pipe line that might, in turn, again be stressed by temperature differences is avoided.

In accordance with another feature of the invention, a block for a mixing and distributing device for gases having high temperature is provided wherein the block has a rectangular or trapezoidal cross section and has eight corners, the block being formed with respective channels extending from each of the eight corners thereof to a central location of the block. The blocks constructed in accordance with this feature of the invention are intended, if they have a rectangular cross section, for rectangular tanks or vessels and, if they have a trapezoidal cross section, for round or polygonal tanks or vessels. If, as constructed, a channel extends from each of the eight corners to a central location of the block, assurance is provided that the channels will always be connected to the corresponding channels of the adjacent blocks, and the branching and rejoining of the channels required for good mixing are also assured. Due to the convergence of the channels to a central location somewhat in the middle of the block, the block is able to be heated up very rapidly during temperature changes and also is heated up from the inside with only slight temperature differences.

In accordance with a further feature of the invention, the block has a parallelepipedal shape and is formed with four diagonal bores each connecting two of the corners disposed spatially-diagonally opposite one another.

The block, in accordance with this last-mentioned feature, can be manufactured particularly economically. With only four rectilinear bores, respective pairs of spatially-diagonal, opposite corners of the block are connected by channels.

In accordance with an added feature of the invention, the block has a polygonal shape and is formed with channels extending from the middle of one side thereof to the corners of the side thereof located opposite the one side.

The block having the last-mentioned feature of the invention represents a special case of the blocks described therebefore. If two of these blocks are placed in reversed position on top of one another, a block of larger dimensions is produced wherein, again, a channel extends from each corner to the center. This block can also be divided, of course, into smaller units.

In accordance with an additional feature of the invention, the blocks of the mixing and distributing device are formed with channels having cross sections varying in size in at least one direction of the radial and axial directions thereof.

With the mixing and distributing device having the last-mentioned feature, a velocity distribution varying over the cross section can be altered in a desired manner. If, for example, a higher flow velocity than in the center is expected at the periphery of the mixing and distributing device, because of the substantially shorter channels at the periphery, this can be compensated for by providing correspondingly smaller channel diameters. By means of channel diameters decreasing radially outwardly in the upper blocks, the gas flow can be directed from the periphery more toward the center of the mixing and distributing device.

In accordance with yet another feature of the invention, the base of a gas-cooled pebble-fed reactor having a mixing and distributing device corresponding to the foregoing comprises a pebble bed disposed on a boundary surface defined by a layer of the blocks, the channels formed in the blocks being a multiplicity of parallel channels having respective diameters smaller than the diameter of the pebbles of the bed.

According to this feature of the invention, the base of a gas-cooled pebble bed reactor serves simultaneously as mixing and distributing device. So that the fuel balls or pellets cannot block the cross section of a channel and also cannot come to rest in the channel opening, each block which is immediately adjacent to the pebble bed is formed with a large number of parallel channels, the dimension i.e. cross-sectional diameter of which is considerably smaller than the diameter of the fuel balls or pellets. Underneath these numerous small channels, a respective plenum or collecting chamber is provided which is in communication with the larger channels of the block therebeneath. Since these blocks immediately adjacent to the pebble bed are subjected to the highest temperatures and therefore, also, to the greatest temperature differences, it is advantageous for these blocks to be made of an especially high-quality material.

In accordance with a concomitant feature of the invention, the base includes, at the underside of the boundary surface-defining layer of blocks, at least another layer of blocks formed with channels, the lowermost of which, respectively, are inclined to the middle of the reactor or to one of a plurality of discharge outlets distributed over the cross section of the base.

In accordance with the last-mentioned feature, the base relates to a gas-cooled pebble bed reactor which, in an emergency, is to be shut down in the nuclear-physics sence by adding numerous absorber balls or pellets from the top. These absorber balls or pellets have a considerably smaller diameter than that of the fuel balls or pellets and accordingly trickle downwardly through the spaces between the fuel balls or pellets and also into the base or mixing and distributing device, respectively. In order for these absorber balls or pellets to be removable completely i.e. without any remainder, from the pebble bed and from the mixing device when the reactor is to be restarted, the lowest channels of the mixing device are inclined toward the center of the reactor or toward one or more discharge outlets distributed over the cross section, so that the absorber balls or pellets are able to flow off initially through the mixing channels and then through the lowermost inclined channels.

Other features which are considered as characteristic for the invention are set forth in the appended claims.

Although the invention is illustrated and described herein as embodied in a mixing and distributing device for gases at high temperature, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 3 to 10 are enlarged views of individual blocks for the mixing and distributing device according to the invention.

Figure 1:
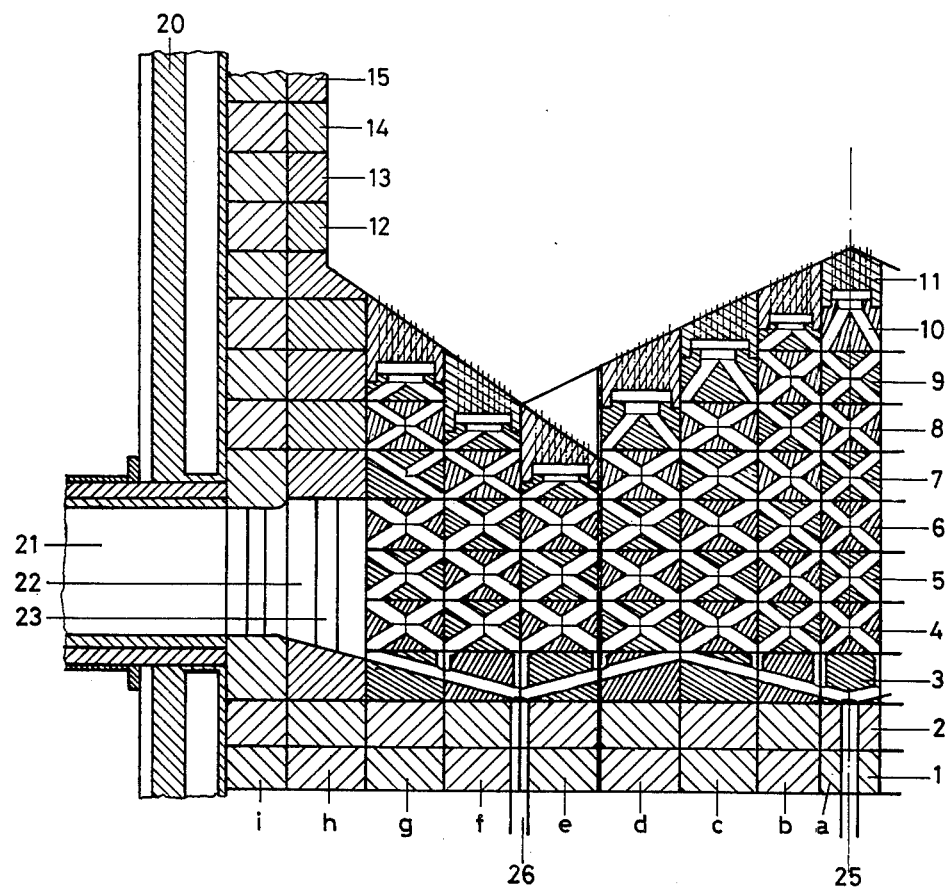
FIG. 1 is a vertical radial section taken along a lower left-hand part of a gas-cooled pebble bed reactor, embodying the gas mixing and distributing device according to the invention, through which helium is to flow from the top to the bottom thereof.

Referring now to the drawing and first, particularly, to FIG. 1 thereof, there are shown numerous layers of blocks sequentially numbered 1 to 15 from the bottom to top and designated outwardly from the center thereof by letters a to i, so that the location of each block is defined by the combination of a number and a letter. During operation of the pebble-bed reactor shown in FIG. 1, a non-illustrated bed of fuel balls or pellets is disposed above the blocks 11a to 9d and the blocks 8e to 11h and is cooled by helium from the top down. The fuel base or pellets are withdrawn downwardly, as described in the herein aforementioned German published non-prosecuted applications through non-illustrated channels underneath the block 8d. Blocks 11a to 9d and 8e to 10g are formed with numerous vertical, parallel gas channels, the cross section of which, however, is so small that the fuel balls or pellets can neither enter them nor come to rest in the openings thereof. The blocks 11h and 11i to 15h and 15i, which are disposed at the side wall, are formed with no gas channels and serve as protection for the side wall elements 20 against high temperatures and against the direct effect of radiation. Below those blocks which are provided with numerous vertical, parallel gas channels, respective gas plenums are provided, from each center of which four inclined gas channels extend to the respective four corners of a block located underneath, such as the block 10b or 9c, for example. The blocks, for example, located beneath the blocks 10b and 9c, have a respective channel running to the center thereof from all eight corners thereof, each of those channels being forcibly in communication with the corresponding channels of blocks located adjacent thereto or therebelow. Through this repeated or multiple division, diversion and recombination or partial flows, varying gas temperatures are rapidly equalized. In addition, the hot gas is conducted through the numerous diagonal canals to an annular plenum 22. From there, the hot gas flows to several gas channels 21 distributed over the periphery of the reactor. To increase the flow cross section, columns 23 are provided instead of blocks in the annular collecting chamber or plenum 22 between the blocks 3h and 7h. In blocks 3a to 3g, only those channels are provided which are to conduct the hereinafore described absorber balls or pellets to discharge pipes 25 and 26.

Figure 2:
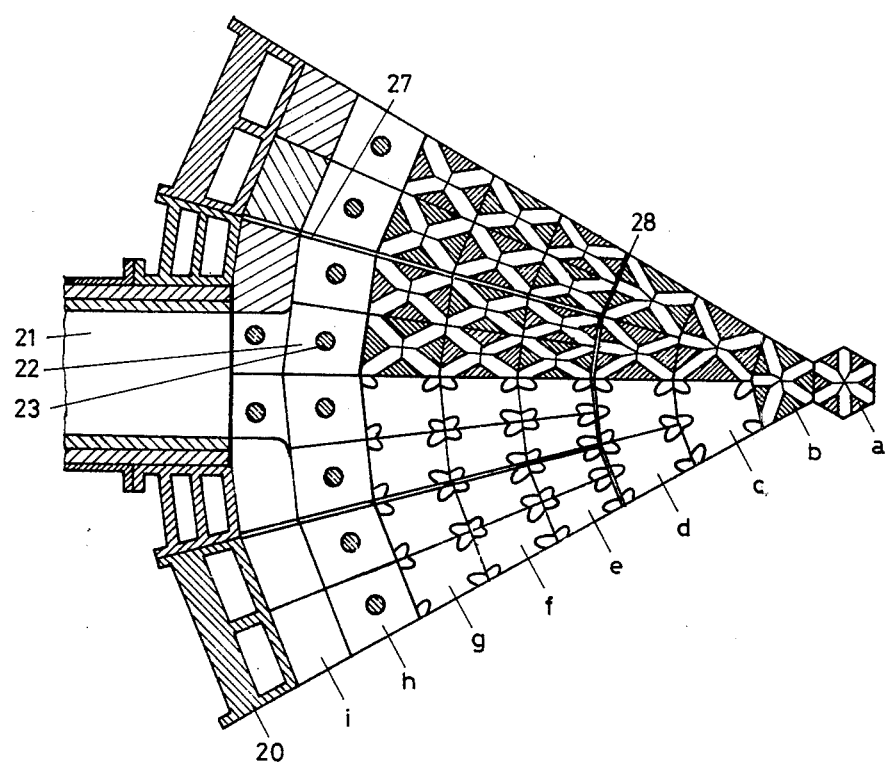
FIG. 2 is a horizontal cross-sectional view of FIG. 1 taken in part through a layer of blocks and in part between two layers of blocks.

FIG. 2 shows how the gas flows are conducted to the hot gas channels 21 in a horizontal plane. In the embodiment of the invention of this application, the reactor vessel is confined at the side wall by polygonally disposed side wall elements 20, which are penetrated by these gas channels 21 at several locations uniformly distributed over the peripheral surface of the reactor. To permit unimpeded expansion of the blocks when the temperature rises, radial expansion gaps 27 are provided between major sectors, and a polygonal expansion gap 28 between these major sectors and a central inner cone. It is especially important that the gas channels 21 terminate, respectively, in the middle between these radial expansion gaps 27, so that temperature strands are not conducted unhindered to the gas channels 21 through these expansion gaps.

FIGS. 3, 5, 7 and 9 show individual blocks, respectively, in a side elevational view thereof, while the respective FIGS. 4, 6, 8 and 10, respectively shown therebeneath, depict the same block in a top plan view. The block shown in FIGS. 3 and 4 is found in FIG. 1, for example, as block 5f. The block shown in FIGS. 5 and 6 is found in FIG. 1, for example, as block 10b. The block shown in FIGS. 7 and 8 is not shown in FIGS. 1 and 2, but is also within the scope of the invention. The hexagonal block shown in FIGS. 9 and 10 shows that the principle of the invention can be applied, for example, also to a reactor base formed of hexagonal blocks.

We claim:

1. Mixing and distributing device for gases of a nuclear reactor having high temperature comprising a multiplicity of polygonal blocks stacked in a plurality of layers above and laterally adjacent one another, each of said blocks being formed with at least two channels having respective axes extending from a corner of each of said blocks to the center thereof, each channel having an end communicating with all other channels formed in a given block and another end communicating with at least one adjacent channel formed in adjacent blocks.

2. A mixing and distributing device for gases having high temperature according to claim 1, wherein the block has a rectangular or trapezoidal cross section and has eight corners, the block being formed with respective channels extending from each of said eight corners thereof to a central location of the block.

3. A mixing and distributing device according to claim 2 wherein the block has a parallelepipedal shape and being formed with four diagonal bores each connecting two of said corners disposed spatially-diagonally opposite one another.

4. A mixing and distributing device according to claim 2 wherein the block comprises two halfblocks, each having a polygonal shape and being formed with channels extending from the middle of one side thereof to the corners of the side thereof located opposite said one side.

5. Mixing and distributing device according to claim 1 wherein said channels have cross sections varying in size in at least one direction of said radial and axial directions thereof.

6. Mixing and distributing device according to claim 1, including a base of a gas-cooled pebble-bed reactor, said base comprising a pebble bed disposed on a boundary surface defined by a layer of said blocks, said channels formed in said blocks being a multiplicity of parallel channels having respective diameters smaller than the diameter of the pebbles of said bed.

7. Mixing and distributing device according to claim 6 including, at the underside of said boundary surface-defining layer of blocks, at least another layer of blocks formed with channels, the lowermost of which, respectively, are inclined to one of a plurality of discharge outlets distributed over the cross section of the base.

8. Mixing and distributing device according to claim 6 including, at the underside of said boundary surface-defining layer of blocks, at least another layer of blocks formed with channels, the lowermost of which, respectively, are inclined to the middle of the reactor.

* * * * *